United States Patent
Zhang et al.

(10) Patent No.: US 8,687,516 B2
(45) Date of Patent: Apr. 1, 2014

(54) METHOD, APPARATUS AND SYSTEM FOR SPECTRUM PREDICTION

(75) Inventors: Gong Zhang, Shenzhen (CN); Jiao Wang, Shenzhen (CN); Yanping Xiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 13/407,220

(22) Filed: Feb. 28, 2012

(65) Prior Publication Data

US 2012/0155318 A1    Jun. 21, 2012

Related U.S. Application Data

(63) Continuation of application No. PCT/CN2010/076380, filed on Aug. 26, 2010.

(30) Foreign Application Priority Data

Aug. 28, 2009  (CN) .......................... 2009 1 0171727

(51) Int. Cl.
    *H04L 1/00* (2006.01)
(52) U.S. Cl.
    USPC .......................................... 370/252; 370/322
(58) Field of Classification Search
    USPC ......... 370/252, 229, 233, 234, 235, 253, 322, 370/335, 336, 344, 347
    See application file for complete search history.

(56) References Cited

U.S. PATENT DOCUMENTS

| | | | |
|---|---|---|---|
| 2003/0108008 A1 | 6/2003 | Agrawal et al. | |
| 2008/0005219 A1 | 1/2008 | Nabar et al. | |
| 2008/0069079 A1 | 3/2008 | Jacobs | |

FOREIGN PATENT DOCUMENTS

| | | |
|---|---|---|
| CN | 1541004 A | 10/2004 |
| CN | 1889752 A | 1/2007 |
| CN | 101262701 A | 9/2008 |
| CN | 101277278 A | 10/2008 |
| CN | 101442807 A | 5/2009 |
| EP | 1424865 A1 | 6/2004 |
| KR | 20070014746 A | 2/2007 |
| WO | WO 02/19743 A2 | 3/2002 |
| WO | WO 2009/025445 A1 | 2/2009 |
| WO | WO 2009/030035 A1 | 3/2009 |
| WO | WO 2011/023118 A1 | 3/2011 |

OTHER PUBLICATIONS

International Search Report and Written Opinion of the International Searching Authority issued in corresponding PCT Patent Application No. PCT/CN2010/076380, mailed Dec. 2, 2010.
Office Action issued in corresponding Chinese Patent Application No. 200910171727.5, mailed Dec. 27, 2012.
Extended European Search Report issued in corresponding European Patent Application No. 10811278.0, mailed May 8, 2012.

*Primary Examiner* — Dady Chery
(74) *Attorney, Agent, or Firm* — Brinks Gilson & Lione

(57) ABSTRACT

Method, system and apparatus for spectrum prediction are provided. The method includes: obtaining the first sampling data of target spectrum, wherein the first sampling data including existing service information, channel information and channel state information of the target spectrum; extracting channel state information of all channels of the same service in each timeslot from the first sampling data, and generating a sampling matrix; extracting a spectrum resource occupancy mode combination of the target spectrum from the sampling matrix; obtaining the second sampling data of the target spectrum, matching the spectrum resource occupancy mode combination according to the second sampling data of the target spectrum, and predicting the channel state of the target spectrum in a future timeslot according to the matching result.

13 Claims, 7 Drawing Sheets

| | $t_1$ | $t_2$ | $t_3$ | $t_4$ | $t_5$ | ... | $t_{n-3}$ | $t_{n-2}$ | $t_{n-1}$ | $t_n$ | $t_{n+1}$ |
|---|---|---|---|---|---|---|---|---|---|---|---|
| $ch_1$ | 1 | 1 | 0 | 1 | 0 | ... | 0 | 1 | 0 | 1 | ? |
| $ch_2$ | 0 | 1 | 1 | 0 | 1 | ... | 0 | 1 | 1 | 0 | ? |
| $ch_3$ | 1 | 0 | 1 | 1 | 0 | ... | 1 | 0 | 1 | 1 | ? |
| $ch_4$ | 1 | 0 | 1 | 0 | 0 | ... | 0 | 0 | 1 | 1 | ? |
| $ch_5$ | 0 | 1 | 0 | 0 | 1 | ... | 1 | 1 | 0 | 1 | ? |
| $ch_6$ | 0 | 1 | 1 | 0 | 1 | ... | 0 | 0 | 1 | 1 | ? |
| $ch_7$ | 1 | 0 | 1 | 0 | 0 | ... | 1 | 1 | 1 | 0 | ? |
| ... | ... | ... | ... | ... | ... | ... | ... | ... | ... | ... | ? |
| $ch_m$ | 1 | 1 | 0 | 0 | 1 | ... | 0 | 1 | 0 | 0 | ? |

Fig.8

| | $t_1$ | $t_2$ | $t_3$ | $t_4$ | $t_5$ | $t_6$ | $t_7$ | $t_8$ | $t_9$ | ... | $t_n$ |
|---|---|---|---|---|---|---|---|---|---|---|---|
| $ch_1$ | 1 | 1 | 0 | 1 | 0 | 1 | 0 | 1 | 0 | ... | 1 |
| $ch_2$ | 0 | 1 | 1 | 0 | 1 | 0 | 0 | 1 | 1 | ... | 0 |
| $ch_3$ | 1 | 0 | 1 | 1 | 0 | 1 | 1 | 0 | 1 | ... | 0 |
| $ch_4$ | 1 | 0 | 1 | 0 | 0 | 1 | 0 | 0 | 1 | ... | 1 |
| $ch_5$ | 0 | 1 | 0 | 0 | 1 | 1 | 1 | 1 | 0 | ... | 1 |
| $ch_6$ | 0 | 1 | 1 | 0 | 1 | 1 | 0 | 0 | 1 | ... | 1 |
| $ch_7$ | 1 | 0 | 1 | 0 | 0 | 0 | 1 | 1 | 1 | ... | 0 |
| ... | ... | ... | ... | ... | ... | ... | ... | ... | ... | ... | 1 |
| $ch_m$ | 1 | 1 | 0 | 0 | 1 | 1 | 0 | 1 | 0 | ... | 0 |

⇓

| | $t_1$ | ... | $t_{n-7}$ | $t_{n-6}$ | $t_{n-5}$ | $t_{n-4}$ | $t_{n-3}$ | $t_{n-2}$ | $t_{n-1}$ | $t_n$ | $t_{n+1}$ |
|---|---|---|---|---|---|---|---|---|---|---|---|
| $ch_1$ | 1 | ... | 0 | 0 | 1 | 1 | 0 | 1 | 1 | 1 | ? |
| $ch_2$ | 1 | ... | 1 | 1 | 1 | 0 | 1 | 0 | 0 | 0 | ? |
| $ch_3$ | 0 | ... | 0 | 1 | 0 | 0 | 1 | 1 | 1 | 1 | ? |
| $ch_4$ | 0 | ... | 1 | 1 | 0 | 1 | 0 | 1 | 1 | 0 | ? |
| $ch_5$ | 1 | ... | 0 | 0 | 1 | 0 | 1 | 1 | 0 | 1 | ? |
| $ch_6$ | 0 | ... | 0 | 1 | 0 | 1 | 0 | 0 | 1 | 0 | ? |
| $ch_7$ | 1 | ... | 1 | 0 | 1 | 0 | 1 | 1 | 0 | 1 | ? |
| ... | ... | ... | ... | ... | ... | ... | ... | ... | ... | ... | ? |
| $ch_m$ | 0 | ... | 1 | 0 | 0 | 1 | 0 | 1 | 0 | 1 | ? |

Fig.9

METHOD, APPARATUS AND SYSTEM FOR SPECTRUM PREDICTION

CROSS-REFERENCE TO RELATED APPLICATION

This application is a continuation of International Application No. PCT/CN2010/076380, filed on Aug. 26, 2010, which claims priority to Chinese Patent Application No. 200910171727.5, filed with the Chinese Patent on Aug. 28, 2009, both of which are hereby incorporated by reference in its entirety.

FIELD OF THE INVENTION

The present invention relates to the field of communication, and particularly, to method, apparatus and system for spectrum prediction.

BACKGROUND OF THE INVENTION

With the rapid development of the wireless communication technique, as the most precious resource in the wireless communication, the spectrum is increasingly demanded. Currently, the spectrum resource is usually allocated by the state to various organizations requiring the spectrum. Studies have shown that in the allocated spectrum resource, the utilization ratios of most frequency bands are lower than 25%, and some even lower than 10%. But the spectrum demand of some emerging wireless services and wireless devices cannot be satisfied. Thus how to effectively utilize the spectrum resource has become a hot issue in the field of wireless communication. The Cognitive Radio (CR) technique developed based on software radio technique emerges at the right moment. The CR technique sufficiently considers the low utilization ratio of the existing spectrum resource and the intellectualization evolution route of wireless communication technique, adaptively changes the application parameters according to the specific learning and decision-making algorithms by perceiving the ambient environment, and dynamically detects and selects idle spectrums that can be effectively utilized. The Dynamic Spectrum Access (DSA) is an important direction in the technical field of CR, and it allows multiple systems to share one band, and permits the lately accessed system to occupy the frequency without influencing other systems' communication. The precondition of the DSA technique is spectrum sensing, i.e., searching an available idle band, and the spectrum sensing is the prerequisite for the Secondary User (SU) to access the service. Since the sensing time demanded is short and the spectrum to be sensed has a large bandwidth, the current spectrum sensing technique has much difficulty.

The problem of the spectrum sensing technique can be solved using the spectrum measuring technique and the method for spectrum prediction. The spectrum measuring technique is one of the basic techniques for leading the cognitive radio technique to the actual applications.

The current spectrum measuring technique usually adopts the first order Markov process to predict the channel state, and the basic idea is to assume that the channel state in the current timeslot is only related to that of the previous timeslot; and the channel state transition occurs at the first moment of each timeslot.

During the implementation of the present invention, the inventors find that the prior art at least has the following problem.

In the spectrum prediction scheme of the first order Markov model, the channel state at the next moment is only related to the current channel state, and is not related much to the states in the historic timeslots of each channel. The correlativity between the channels is not specifically considered during the analysis process, and in case of multiple channels, the channels are generally assumed as being independent from each other. Thus, during the spectrum prediction process, the prediction accuracy for the spectrum state in the future timeslot is low, the miss ratio and omission ratio are high, and the spectrum hole selection is not reliable.

SUMMARY OF THE INVENTION

The embodiments of the present invention provide a method, apparatus and system for spectrum prediction, so as to reduce the miss ratio and omission ratio in the spectrum prediction process, and improve the accuracy of the spectrum prediction.

The embodiment of the present invention provides a method for spectrum prediction. The method includes obtaining the first sampling data of a target spectrum, wherein the first sampling data includes the existing service information, channel information and channel state information of the target spectrum; extracting channel state information of all channels of a same service in each timeslot from the first sampling data, and generating a sampling matrix; extracting the spectrum resource occupancy mode combination of the target spectrum from the sampling matrix; and obtaining the second sampling data of the target spectrum, matching the spectrum resource occupancy mode combination according to the second sampling data of the target spectrum, and predicting the channel state of the target spectrum in a future timeslot according to the matching result.

The embodiment of the present invention further provides an apparatus for spectrum resource occupancy mode extraction. The apparatus includes: a first data acquisition unit configured to obtain the first sampling data of a target spectrum, wherein the first sampling data includes the existing service information, channel information and channel state information of the target spectrum; a sampling matrix generation unit configured to extract the channel state information of all channels of a same service in each timeslot from the first sampling data, and generate a sampling matrix; and a mode analysis unit configured to analyze the sampling matrix, and extract a spectrum resource occupancy mode combination of the target spectrum from the sampling matrix.

The embodiment of the present invention further provides an apparatus for spectrum resource prediction. The apparatus includes: a second data acquisition unit configured to obtain the second sampling data of a target spectrum, wherein the second sampling data includes service information, channel information and channel state information of the target spectrum in real time; a target matrix generation unit configured to extract from the second sampling data, the channel state information of all channels of a same service in each timeslot, and generate a target matrix; and a channel prediction unit configured to, when the target matrix has any data matching the first spectrum resource occupancy mode in the spectrum resource occupancy mode combination, predict the channel state of the target spectrum in a future timeslot according to the second spectrum resource occupancy mode associated with the first spectrum resource occupancy mode.

The embodiment of the present invention further provides a spectrum prediction system. The system includes: an apparatus for spectrum resource occupancy mode extraction configured to obtain the first sampling data of a target spectrum, wherein the first sampling data includes the existing service information, channel information and channel state information of the target spectrum; extract the channel state information of all channels of a same service in each timeslot from the first sampling data and generate a sampling matrix; and extract the spectrum resource occupancy mode combination of the target spectrum from the sampling matrix; and an apparatus for spectrum resource prediction configured to obtain the second sampling data of the target spectrum, match the spectrum resource occupancy mode combination according to the second sampling data of the target spectrum, and predict the channel state of the target spectrum in a future timeslot according to the matching result.

The method, apparatus and system for spectrum prediction according to the embodiments of the present invention obtain the spectrum resource occupancy mode combination of the target spectrum from the first data of the target spectrum, match the spectrum resource occupancy mode combination by using the second data of the target spectrum, and predict the channel state of the target spectrum in a future timeslot according to the matching result, thereby reducing the miss ratio and omission ratio in the spectrum prediction process, and improving the accuracy of the spectrum prediction.

BRIEF DESCRIPTION OF THE DRAWINGS

In order to more clearly describe the technical solutions of the embodiments of the present invention, the drawings to be used in the descriptions of the embodiments or the prior art are briefly introduced as follows. Obviously, the following drawings just illustrate some embodiments of the present invention, and a person skilled in the art can obtain other drawings from these drawings without paying any creative effort.

FIG. 8 is a schematic diagram of the method for spectrum prediction according to a second embodiment of the present invention;

FIG. 9 is a schematic diagram of the spectrum prediction method according to a third embodiment of the present invention;

DETAILED DESCRIPTION OF THE PREFERRED EMBODIMENTS

The technical solutions of the embodiments of the present invention will be clearly and completely described as follows in conjunction with the drawings. Obviously, the described embodiments are just a part of the embodiments of the present invention rather than all the embodiments. Based on the embodiments of the present invention, any other embodiment obtained by a person skilled in the art without paying any creative effort shall fall within the protection scope of the present invention.

The wireless access system adaptive to the embodiments of the present invention includes Global System for Mobile Communications (GSM), Wideband-Code Division Multiple Access (WCDMA), Time Division—Synchronized Code Division Multiple Access (TD-SCDMA), Code-Division Multiple Access (CDMA), Worldwide Interoperability for Microwave Access (WIMAX), Wireless Local Area Network (WLAN), Long Term Evolution (LTE), etc.

The embodiments of the present invention make an analysis based on the actual sampling data. The analysis data is acquired at four locations in south China (two in the city and two in the country), the sampling duration is seven days, the target spectrum range is 20 MHz to 3 GHz, the spectrum distribution interval of the sampling points is 0.2 MHz, and the time distribution interval of the sampling points, i.e. timeslot, is 75 s.

Figure 1:
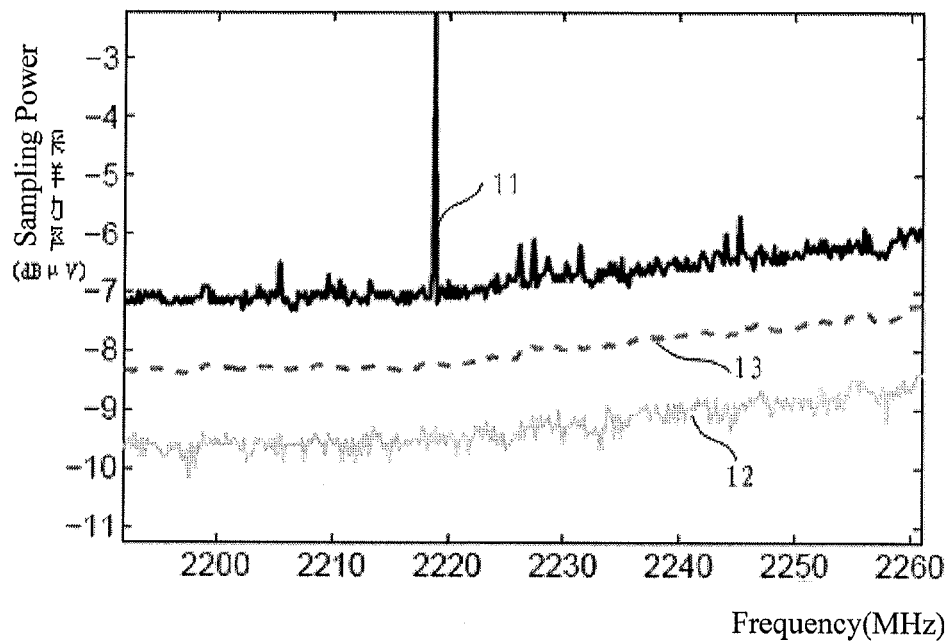
FIG. 1 is a schematic diagram of a channel state decision method according to an embodiment of the present invention.

Firstly, the channel state in the current timeslot can be acquired by extracting and analyzing the sampling frequency in each timeslot. The channel state is defined as an idle state represented by "0" and a busy state represented by "1". FIG. 1 is a schematic diagram of a channel state decision method according to an embodiment of the present invention. As illustrated in FIG. 1, in case there is no effective signal, the measured maximum value of the noise power is the highest sampling frequency 11, and the measured minimum value of the noise power is the lowest sampling frequency 12. In FIG. 1, the interval between the highest sampling frequency 11 and the lowest sampling frequency 12 is close to 3 dBµV, and the lowest value of the sampling frequency in a certain channel is noise, thus the noise threshold power can be defined. For example, in a certain frequency band, the measured minimum power of the channel is set as min P, and the noise threshold power K can be defined as Equation (1):

$$K = \min P + 3 dB\mu V \qquad (1)$$

When the maximum sampling power of the channel in a certain timeslot exceeds the threshold power K, the channel state in this timeslot may be deemed as busy, otherwise the channel state in this timeslot may be deemed as idle.

Figure 2:
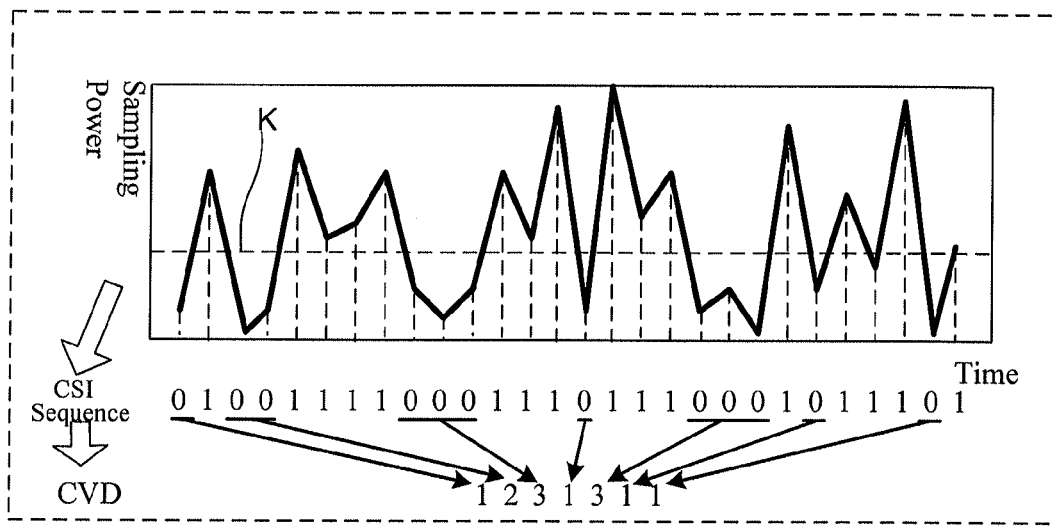
FIG. 2 is a schematic diagram of generating Channel Vacancy Duration (CVD) sequences according to an embodiment of the present invention.

FIG. 2 is a schematic diagram of generating CVD sequences according to an embodiment of the present invention. As illustrated in FIG. 2, the channel state is 1 (busy) when the maximum sampling power of the channel in each timeslot is higher than the threshold power K, and the channel state is 0 (idle) when the maximum sampling power of the channel in each timeslot is lower than the threshold power K. In FIG. 2, the CVD is the number of continuous "0" (idle) in a Channel State Information (CSI) sequence. The higher the CVD is, the less the occupied time of the channel is, and the higher the use value of the channel is.

Figure 3:
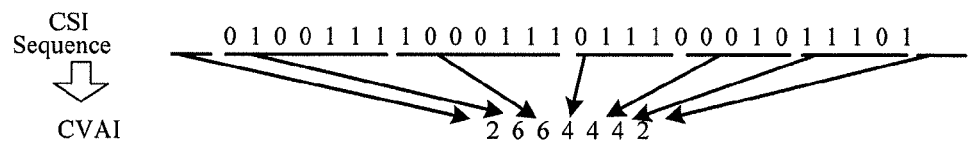
FIG. 3 is a schematic diagram of generating Channel Vacancy Appearance Interval (CVAI) sequences according to an embodiment of the present invention.

FIG. 3 is a schematic diagram of generating CVAI sequences according to an embodiment of the present invention. The sequential CVAIs in FIG. 3 can be obtained by taking the CSI sequence in FIG. 2 as an example, in which the CVAI is the interval between the adjacent occurrences of continuous "0" (idle) in the CSI sequence.

Figure 4:
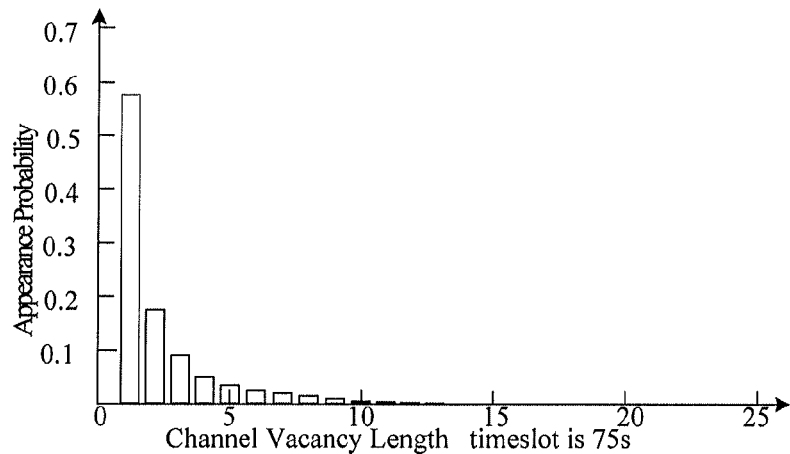
FIG. 4 is a CVD distribution curve of a GSM900 uplink according to an embodiment of the present invention.

FIG. 4 is a CVD distribution curve of a GSM900 uplink according to an embodiment of the present invention. As illustrated in FIG. 4, for example in the GSM900 uplink, after all the sampling data is analyzed, the CVD distribution curve is counted, and it meets the following Equation (2):

$$y=a+be^{-cx} \qquad (2)$$

In the CVD distribution curve of the GSM900 uplink as illustrated in FIGS. 4, a=0.000947, b=1.671621, c=1.079681 and $r^2$=0.993586, in which $r^2$ is the similarity between the data calculated according to Equation (2) and the actual data. When the value of $r^2$ gets close to 1, the counted result of Equation (2) approaches the actual value.

The parameter table of a, b and c in the CVD distribution curves of each service in Equation (2) can be obtained through statistic. The service may be various types of services in the wireless communication, for example, as illustrated in Table 1 (Parameter Table of CVD Distribution Curve of Each Service)

TABLE 1

Parameter Table of CVD Distribution Curve of Each Service

| Service | a | b | c | $r^2$ |
|---|---|---|---|---|
| GSM900 uplink | 0.001887 | 1.740828 | 1.086233 | 0.993586 |
| GSM900 downlink | 0.000883 | 1.203442 | 0.911078 | 0.987065 |
| GSM1800 uplink | 0.00046 | 1.044305 | 0.873491 | 0.981235 |
| GSM1800 downlink | 0.000289 | 2.239406 | 1.307285 | 0.993754 |
| CDMA uplink | 0.000937 | 0.355216 | 0.424772 | 0.947483 |
| CDMA downlink | 0.003895 | 2.197034 | 1.305444 | 0.991024 |
| ISM | 0.000187 | 1.001091 | 0.748866 | 0.995018 |
| TV1 | 0.000577 | 1.014972 | 0.849229 | 0.982828 |
| TV2 | 0.00056 | 0.776721 | 0.732062 | 0.977416 |
| TV3 | 0.000263 | 1.040206 | 0.882333 | 0.976712 |
| TV4 | 0.000187 | 1.213682 | 0.982802 | 0.977935 |

Next, the Service Congestion Rate (SCR) will be analyzed. The SCR of a certain service at moment t is calculated according to Equation (3):

$$SCR(t,S) = \text{the number of the channels in a busy state of the service at moment t/the number of all channels of the service} \qquad (3)$$

Figure 5:
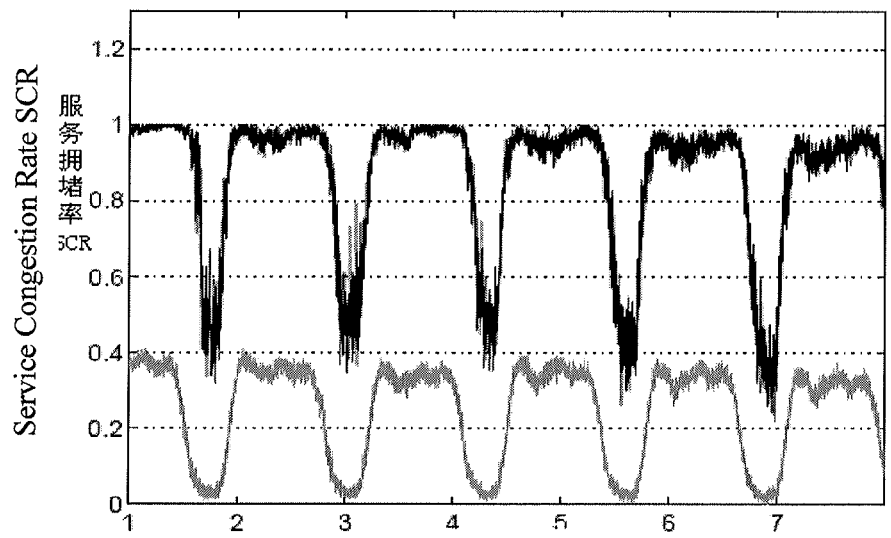
FIG. 5 is an SCR statistical curve diagram of GSM900 and GSM1800 uplinks according to an embodiment of the present invention.

The SCR can reflect the congestion regular pattern of various services. FIG. 5 shows the SCR statistical curves of GSM900 and GSM1800 uplinks according to an embodiment of the present invention. As can be seen from FIG. 5, the SCR distributions of the two services (GSM900 and GSM1800) are daily repetitive. Similarly, the SCR of other service is also daily repetitive, and the service type is not limited herein.

Figure 6:
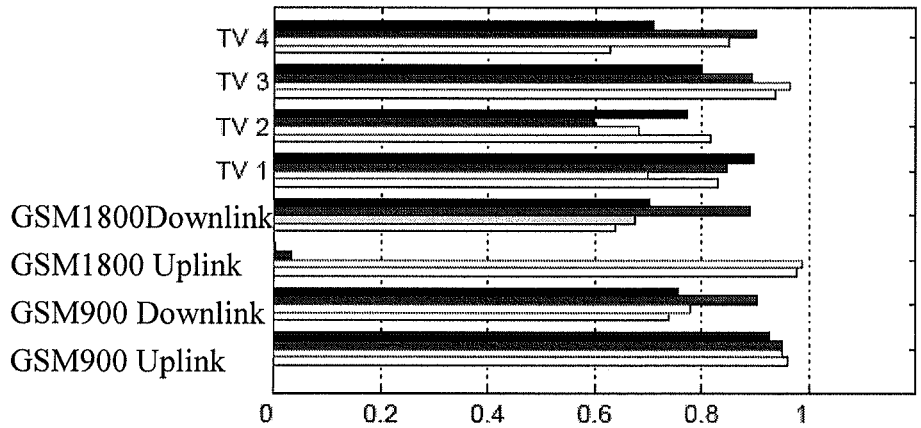
FIG. 6 is a schematic diagram of SC of part of services according to an embodiment of the present invention.

Next, the Spectrum Correlation (SC) of the SCR sequence is analyzed. FIG. 6 is a schematic diagram of SCs of part of services according to an embodiment of the present invention. As can be seen from FIG. 6, the SC between different channels of the same service in the TV band and the GSM band can reach 90%, and particularly, the SCs in GSM900 uplink, GSM1800 uplink and a part of the TV band are up to 95% or more.

In conclusion, the CVD of the same service is in a regular curve distribution as the time changes, and the curve equation is $y=a+be^{-cx}$. In the one day cycle, the SCRs of the same service have a high similarity. Different channels of the same service have a high SC in time, space and frequency. Thus the state of a channel in a future timeslot can be predicted according to historic state of the channel in the spectrum resource. The main idea of the embodiments of the present invention is to predict the channel state of each service in a future timeslot according to the first data of each channel in the spectrum resource of each service.

Figure 7:
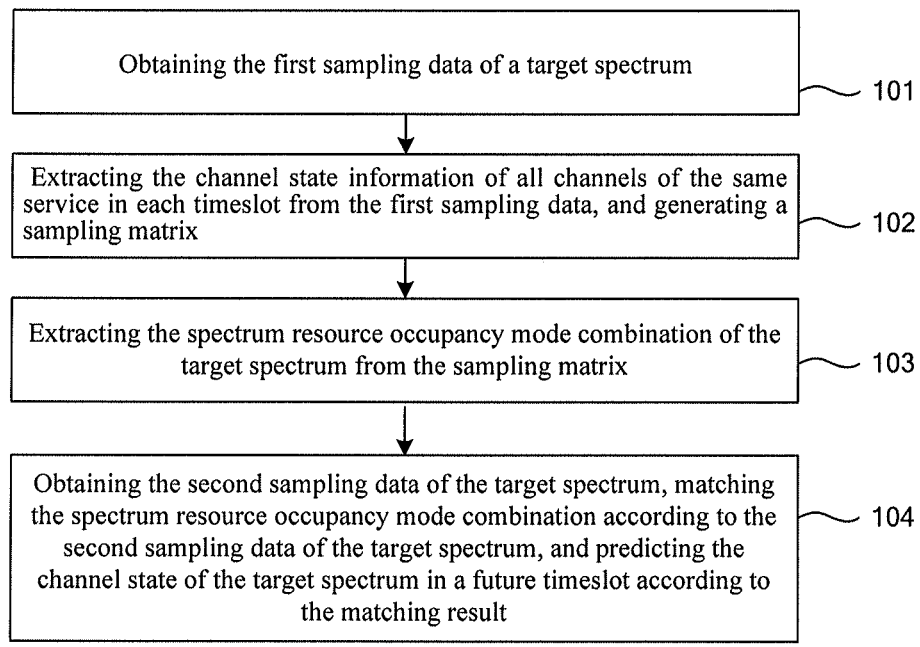
FIG. 7 is a flowchart of the method for spectrum prediction according to a first embodiment of the present invention.

FIG. 7 is a flowchart of the method for spectrum prediction according to a first embodiment of the present invention. As illustrated in FIG. 7, the method for spectrum prediction includes the following steps.

In step 101, first sampling data of a target spectrum is obtained, which includes the existing service information, channel information and channel state information of the target spectrum.

The method for obtaining the first sampling data of the target spectrum specifically includes acquiring first data of the target spectrum to obtain the first sampling data. The first data includes historic data, e.g., the existing spectrum resource data of the target spectrum in a certain historic period. In the embodiment of the present invention, the first data of the target spectrum is acquired at a certain interval (timeslot) during a fixed time period, wherein the fixed time period and the timeslot can be selected according to the actual measurement capability. The data acquisition results are collected and stored to form initial first sampling data, which may include service information of all services, all channel information of each service and channel state information of each channel acquired in the target spectrum.

In step 102, the channel state information of all channels of the same service in each timeslot is extracted from the first sampling data to generate a sampling matrix.

During the processing of the first sampling data, the values of all channels of a same service in each timeslot are extracted as a two-dimensional (2D) sampling matrix for mining spectrum resource occupancy modes. It may be assumed that "0" is the channel idle state, and "1" is the channel busy state, and the obtained 2D sampling matrix is a 2D "0/1" matrix about channel and timeslot.

The sampling matrix may be generated through obtaining a minimum detected power of a selected channel of the service in a selected timeslot from the first sampling data and setting a threshold power of the selected channel according to the minimum detected power.

When a maximum sampling power of the selected channel of the service in the selected timeslot is higher than the threshold power, the channel state of the selected channel in the selected timeslot is busy; otherwise the channel state of the selected channel in the selected timeslot is idle.

The channel state information of all channels of the same service in each timeslot is integrated into a sampling matrix, in which, the element for the channel state information corresponding to the busy state is 1 (also may be other constant), and the element for the channel state information corresponding to the idle state is 0 (also may be other constant).

For example, assuming that the minimum detected power in the selected timeslot is min P, then the threshold power K of the selected channel can be defined with reference to Equation (1) K=min P+3dBuV. The matrix element decision method during a process of converting the first sampling data into the 2D sampling matrix specifically may be as follows: comparing a maximum sampling power of the channel in a certain timeslot with the threshold power K; if the maximum sampling power is larger than K, the channel is deemed as being busy in the timeslot, and in the 2D sampling matrix, corresponding element for the channel in the timeslot is "1"; and if the maximum sampling power is smaller than K, the channel is deemed as being idle in the timeslot, and in the 2D sampling matrix, corresponding element for the channel in the timeslot is "0". In the 2D sampling matrix, the idle state is represented by but not limited to "0", and the busy state is represented by but not limited to "1".

In step 103, a spectrum resource occupancy mode combination of the target spectrum is extracted from the sampling matrix.

The spectrum resource occupancy mode combination is extracted by analyzing the generated sampling matrix, specifically including the following steps.

Firstly, a first spectrum resource occupancy mode occurring in a frequency higher than a threshold is extracted from the sampling matrix. The data in the sampling matrix is corresponding to a 2D array, and extracting a spectrum resource occupancy mode from the sampling matrix is to extract a subset from the 2D array corresponding to the sampling matrix. For the convenience of description, the spectrum resource occupancy mode extracted in this step is referred to as a first spectrum resource occupancy mode. When the first spectrum resource occupancy mode occurs in a frequency higher than a predetermined threshold, it can be deemed as an effective spectrum resource occupancy mode.

Next, a second spectrum resource occupancy mode occurring in a frequency higher than the threshold and associated with the first spectrum resource occupancy mode is obtained from the sampling matrix. The sampling matrix is searched for other effective spectrum resource occupancy mode associated with the first spectrum resource occupancy mode, which is called as the second spectrum resource occupancy mode.

In this embodiment, the association between the first and second spectrum resource occupancy modes is the relation between the source and target modes, as shown in the following examples.

EXAMPLE 1 when the first spectrum resource occupancy mode is included in the second spectrum resource occupancy mode, the first spectrum resource occupancy mode is a source mode, and the second spectrum resource occupancy mode is a target mode. That is, when a certain spectrum resource occupancy mode in the sampling matrix is included in other mode, the included spectrum resource occupancy mode is referred to as the source mode, and the spectrum resource occupancy mode including the source mode is referred to as the target mode.

EXAMPLE 2 when the second spectrum resource occupancy mode occurs at an interval of a certain number of timeslots after the first spectrum resource occupancy mode occurs, the first spectrum resource occupancy mode is a source mode, and the second spectrum resource occupancy mode is a target mode. That is, when an associated mode occurs at an interval of N timeslots after a certain spectrum resource occupancy mode in the sampling matrix occurs, the spectrum resource occupancy mode occurring previously is referred to as the source mode, and the associated spectrum resource occupancy mode is the target mode.

In case a correlation coefficient between the first and second spectrum resource occupancy modes is higher than a predetermined threshold, the first and second spectrum resource occupancy modes and the correlation coefficient are combined into the spectrum resource occupancy mode combination, in which, the first spectrum resource occupancy mode is a source mode, and the second spectrum resource occupancy mode is a target mode. The correlation coefficient between the source and target modes may be defined as, but not limited to, a ratio of the number of associated occurrences of the source and target modes to the total number of occurrences of the source mode in the sampling matrix. When the correlation coefficient between the source and target modes reaches or exceeds a certain threshold, the source mode, the target mode and the correlation coefficient can be used as an effective spectrum resource occupancy mode combination.

The extraction result of the above spectrum resource occupancy mode combination is stored. The data structure in the spectrum resource occupancy mode combination may include a source mode field, a target mode field and a correlation coefficient field. The source mode field is a 2D array that stores the detection rule for spectrum prediction. The target mode field is a 2D array that stores a spectrum resource occupancy mode associated with the source mode, when the channel state matrix in the current timeslot matches the corresponding source mode, the channel state in the next timeslot can be predicted with the target mode. The correlation coefficient field is a real number between "0" and "1", which represents a probability where the channel state in the next timeslot is that in corresponding timeslot in the target mode. The calculation method is: correlation coefficient=the number of occurrences of the target mode after the source mode occurs/the number of occurrences of the source mode in the sampling matrix.

In step 104: the second sampling data of the target spectrum is obtained, the spectrum resource occupancy mode combination is matched according to the second sampling data of the target spectrum, and the channel state of the target spectrum in a future timeslot is predicted according to a matching result.

Firstly, second data of the target spectrum is acquired to obtain the second sampling data which may include service information, channel information and channel state information at a certain moment or in a certain time period, e.g., service information, channel information and channel state information of the target spectrum in real time. The second data of the target spectrum may be spectrum resource data at certain moment or in a certain time period, e.g., spectrum resource data of the target spectrum in the current time period. The channel state information of each channel of the target spectrum in the current timeslot can be obtained by sampling the second data of the target spectrum to be predicted. The data acquisition results are collected and stored to form initial second sampling data including service information, channel information and channel state information.

Next, channel state information of all channels of the same service in each timeslot is extracted from the second sampling data to generate a target matrix.

During the processing of the second sampling data, the values of all channels of a same service in each of the current timeslots are extracted as a 2D target matrix which serves as a sample space for analyzing and predicting the channel state in the next timeslot. It may be assumed that "0" is the channel idle state, and "1" is the channel busy state, and the obtained 2D sampling matrix is a 2D "0/1" matrix about channel and timeslot.

Finally, when the target matrix has any data matching the first spectrum resource occupancy mode in the spectrum resource occupancy mode combination, the channel state of the target spectrum in a future timeslot is predicted according to the second spectrum resource occupancy mode associated with the first spectrum resource occupancy mode. For example, the target matrix is matched by using the first spectrum resource occupancy mode (source mode). When the first spectrum resource occupancy mode matches some numerical values in the target matrix, it is deemed that the first spectrum resource occupancy mode is successfully matched, and then the analysis process is stopped and the first spectrum resource occupancy mode is output. Next, the successfully matched first spectrum resource occupancy mode serves as an input, and the channel state at corresponding position is predicted using the second spectrum resource occupancy mode (target mode) associated with the first spectrum resource occupancy mode. The prediction result is output, which is the channel state of one or more channels in the next timeslot, i.e., the channel state consistent with the corresponding position of the second spectrum resource occupancy mode, and the consistence probability is the percentage value of the correlation coefficient.

After the process of spectrum resource prediction, the secondary user may perform a selective access by selecting available channels according to the prediction result, and when the state of a channel of the target spectrum in a future timeslot is idle, the channel may be selected for an access in the future timeslot.

In this embodiment the spectrum resource occupancy mode combination can be obtained from the first data of the spectrum resource, such that the spectrum prediction can be performed according to the correlativity between different channels of the same service, thereby increasing the spectrum access opportunity for the secondary user, reducing the miss ratio and omission ratio in the spectrum prediction process, and improving the accuracy of the spectrum prediction and the reliability of the spectrum hole selection, wherein the spectrum hole refers to the temporarily available frequency band not occupied in the spectrum of the currently authorized user.

FIG. 8 is a schematic diagram of a method for spectrum prediction according to a second embodiment of the present invention. On the basis of the spectrum prediction method according to the first embodiment of the present invention, it is assumed that the relation between the spectrum resource occupancy modes in the spectrum resource occupancy mode combination is an inclusion relation. Spectrum resource occupancy modes P1 and P2 are obtained during the acquisition process of the spectrum resource occupancy modes. As illustrated in FIG. 8, the association between P1 and P2 is an inclusion relation, i.e., P1 is a subset of P2, wherein P1 is a source mode of 2×3 matrix, and P2 is a target mode of a 2×4 matrix. It is assumed that the correlation coefficient between P1 and P2 is 95%, i.e., P2 occurs 95 times once P1 occurs 100 times. The object of the spectrum prediction in this embodiment is the channel state at the moment $t_{n+1}$, and the specific process of the method for spectrum prediction includes a process of extracting the spectrum resource occupancy modes and a process of predicting the spectrum resource.

The process of extracting the spectrum resource occupancy modes is carried out as follows.

The first data of the target spectrum is acquired at a certain interval (timeslot) during a fixed time period. The values of all channels of a same service in each timeslot are extracted to obtain a sampling matrix with a structure for example of a 2D "0/1" matrix formed from columns $t_1$ to $t_5$ of the matrix as illustrated in FIG. 8. A spectrum resource occupancy mode combination consisting of the source mode P1, the target mode P2, the correlation coefficient and the association between P1 and P2, etc is extracted from the 2D "0/1" matrix. The details may refer to the descriptions of the method for spectrum prediction according to the first embodiment of the present invention, and herein are omitted.

The process of predicting the spectrum resource is carried out as follows.

Firstly, the target spectrum is scanned to obtain the channel state information of each channel in the current timeslot. Please refer to relevant description of the method for spectrum prediction according to the first embodiment of the present invention and Equation (1) for the channel state decision method.

The scanning result is stored and analyzed to generate a target matrix with a structure for example of a 2D "0/1" matrix formed from columns $t_{n-3}$ to $t_n$ of the matrix as illustrated in FIG. 8. It is assumed that the future timeslot is $t_{n+1}$ timeslot, and the object of the spectrum prediction is to predict the state of each channel in $t_{n+1}$ timeslot.

Next, the target matrix is matched by taking the field in the source mode P1 as the detection rule. In FIG. 8, the source mode P1 matches a matrix composed of columns $t_{n-2}$ to $t_n$ and rows ch4 to ch5 (matching completely or in a certain accuracy). In that case, the source mode P1 is successfully matched with the channel state of the current timeslot, and the states of channels ch4 and ch5 in the next timeslot are predicted according to the target mode P2 associated with the source mode P1. Since the information of the fourth column of P2 is 0 and 1, respectively, i.e., there is a possibility of 95% that the fourth column of the matrix composed of columns $t_{n-2}$ to $t_{n+1}$ and rows ch4 to ch5 is completely consistent with the fourth column of the target mode P2. Therefore, the prediction result can be obtained: the possibility that the channel state of ch4 in timeslot $t_{n+1}$ is 0 (idle) is equal to the correlation coefficient 95%, and the possibility that the channel state of ch5 in timeslot $t_{n+1}$ is 1 (busy) is also 95%.

The secondary user can access the idle channel in timeslot $t_{n+1}$. Thus according to the above prediction result, channel ch4 may be selected as the channel to be dynamically accessed by the secondary user in timeslot $t_{n+1}$.

In this embodiment, the spectrum resource occupancy mode combination can be obtained from the first data of the spectrum resource, so as to perform the spectrum prediction according to the correlativity between different channels of the same service, thereby increasing the spectrum access opportunity for the secondary user, achieving a high accuracy in the spectrum availability prediction process (especially for the prediction in the GSM band and the TV band), and reducing the miss ratio and omission ratio in the spectrum prediction process.

FIG. 9 is a schematic diagram of a method for spectrum prediction according to a third embodiment of the present invention. As illustrated in FIG. 9, on the basis of the method for spectrum prediction according to the first embodiment of the present invention, it is assumed that the relation between the spectrum resource occupancy modes in the spectrum resource occupancy mode combination is a continual relation. Spectrum resource occupancy modes P3 and P4 are obtained during the acquisition process of the spectrum resource occupancy modes. As illustrated in FIG. 9, the association between P1 and P2 is a continual relation, i.e., P4 occurs at an interval of N timeslots after P3 occurs, wherein N=2, P3 is a source mode and P4 is a target mode. The source mode P3 is a 2×3 matrix, and the target mode P4 is a 2×4 matrix. It is assumed that the correlation coefficient between P3 and P4 is 90%, i.e., once P3 occurs 100 times, after each time P3 occurs every two timeslots P4 occurs 90 times. The object of the spectrum prediction in this embodiment is the channel state at the moment $t_{n+1}$, and the specific process of the method for spectrum prediction includes a process of extracting the spectrum resource occupancy modes and a process of predicting the spectrum resource.

The process of extracting the spectrum resource occupancy modes is carried out as follows.

The first data of the target spectrum is acquired at a certain interval (timeslot) during a fixed time period. The values of all channels of the same service in each timeslot are extracted to obtain a sampling matrix with a structure for example of a 2D "0/1" matrix formed from columns $t_1$ to $t_9$ of the matrix as illustrated in FIG. 9. A a spectrum resource occupancy mode combination consisting of the source mode P3, the target mode P4, the correlation coefficient and the association between P3 and P4, etc is extracted from the 2D "0/1" matrix. The details may refer to the descriptions of the method for spectrum prediction according to the first embodiment of the present invention, and herein are omitted.

As can be seen from the spectrum resource occupancy mode combination, the relation between the source mode P3 and the target mode P4 is a continual relation, after P3 occurs every two timeslots the target mode P4 occurs, and the source mode P3 is a 2×3 matrix, the target mode P4 is a 2×3 matrix, and the correlation coefficient between the source mode P3 and the target mode P4 is 90%.

The process of predicting the spectrum resource is carried out as follows:

Firstly, the target spectrum is scanned to obtain the channel state information of each channel in the current timeslot. Please refer to relevant description of the method for spectrum prediction according to the first embodiment of the present invention and Equation (1) for the channel state decision method.

The scanning result is stored and analyzed to generate a target matrix with a structure for example of a 2D "0/1" matrix formed from columns $t_{n-3}$ to $t_n$ of the matrix as illustrated in FIG. 9. It is assumed that the future timeslot is $t_{n+1}$ timeslot, and the object of the spectrum prediction is to predict the state of each channel in $t_{n+1}$ timeslot.

Next, the target matrix is matched by taking the field in the source mode P3 as the detection rule. In this embodiment, the source mode P3 matches a matrix composed of columns $t_{n-4}$ to $t_{n-2}$ and rows ch3 to ch4 (matching completely or in a certain accuracy). In that case, the source mode P3 is successfully matched with the channel state of the current timeslot, and the states of channels ch3 and ch4 in the next timeslot are predicted according to the target mode P4 associated with the source mode P3. Since the possibility that after P3 occurs every two timeslots the target mode P4 occurs is equal to the correlation coefficient 90%, there is a possibility of 90% that the channel states of the channels ch3 and ch4 from timeslots $t_{n+1}$ to $t_{n+3}$ are completely consistent with those of P4. Thus the following prediction result can be obtained: the possibility that the channel states of ch3 from timeslots $t_{n+1}$ to $t_{n+3}$ are 0 (idle), 0 (idle) and 1 (busy) respectively is 90%, and the possibility that the channel states of ch4 from timeslots $t_{n+1}$ to $t_{n+3}$ are 1 (busy), 1 (busy) and 0 (idle) respectively is 90%.

The secondary user can access the idle channel in timeslot $t_{n+1}$, thus according to the above prediction result, channel ch3 may be selected as the channel to be dynamically accessed by the secondary user in timeslot $t_{n+1}$.

In this embodiment, the spectrum resource occupancy mode combination can be obtained from the first data of the spectrum resource, so as to perform the spectrum prediction according to the correlativity between different channels of the same service, thereby increasing the spectrum access opportunity for the secondary user. The channel states in subsequent future timeslots can be predicted through the continual relation between the source mode and the target mode, so as to provide a better dynamic access solution, and provide more choices for the secondary user's channel allocation. Thus the miss ratio and omission ratio in the spectrum prediction process are reduced, and the accuracy of the channel availability prediction process is improved.

Figure 10:
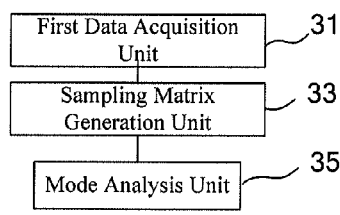
FIG. 10 is a structure diagram of a first example of an apparatus for spectrum resource occupancy mode extraction according to the present invention.

FIG. 10 is a structure diagram of a first example of an apparatus for spectrum resource occupancy mode extraction according to the present invention. As illustrated in FIG. 10, the apparatus for spectrum resource occupancy mode extraction includes: a first data acquisition unit 31, a sampling matrix generation unit 33 and a mode analysis unit 35.

The first data acquisition unit 31 is configured to obtain first sampling data of a target spectrum, wherein the first sampling data includes the existing service information, channel information and channel state information of the target spectrum. The sampling matrix generation unit 33 is configured to extract the channel state information of all channels of the same service in each timeslot from the first sampling data, and generate a sampling matrix.

The mode analysis unit 35 is configured to analyze the sampling matrix, and extract the spectrum resource occupancy mode combination of the target spectrum from the sampling matrix.

Specifically, after the first data acquisition unit 31 acquires the first data of a selected segment of target spectrum in the wireless link, the sampling matrix generation unit 33 stores the acquired first sampling data, processes the first sampling data in a specific rule, and generates a sampling matrix for mining spectrum resource occupancy modes, wherein the sampling matrix is a 2D zero-one matrix composed of timeslots and channels. Next, the mode analysis unit 35 extracts the effective spectrum resource occupancy mode combination by analyzing the sampling matrix output from the sampling matrix generation unit 33. The mode output unit can output an available spectrum resource occupancy mode combination, which includes a source mode field, a target mode field and a correlation coefficient field. The correlation coefficient is a real number between 0 and 1, which represents a probability that the channel state in the next timeslot is the channel state in corresponding timeslot in the target mode. The calculation method is that the correlation coefficient=the number of associated occurrences of the source mode and target mode/the number of occurrences of the source mode in the sampling matrix.

In this embodiment, the method for the apparatus for spectrum resource occupancy mode extraction to extract the spectrum resource occupancy mode combination may refer to relevant descriptions of the method for spectrum prediction according to the first and second embodiments of the present invention.

In this embodiment, after the first data acquisition unit acquires the first data of the target spectrum from the first data of the spectrum resource, the sampling matrix generation unit extracts channel state information of all channels of the same service in each timeslot, and generates a sampling matrix, and the mode analysis unit obtains the spectrum resource occupancy mode combination of the target spectrum by analyzing the sampling matrix, so as to perform the spectrum prediction according to the correlativity between different channels of the same service, thereby increasing the spectrum access opportunity for the secondary user, reducing the miss ratio and omission ratio in the spectrum prediction process, and improving the accuracy of the spectrum prediction.

The apparatus for spectrum resource occupancy mode extraction according to the embodiment of the present invention may be implemented as circuits, integrated circuits, chips, etc. The various units according to the embodiment of the present invention may be integrated or separately arranged. The above units may be combined into one unit, or divided into a plurality of subunits.

Figure 11:
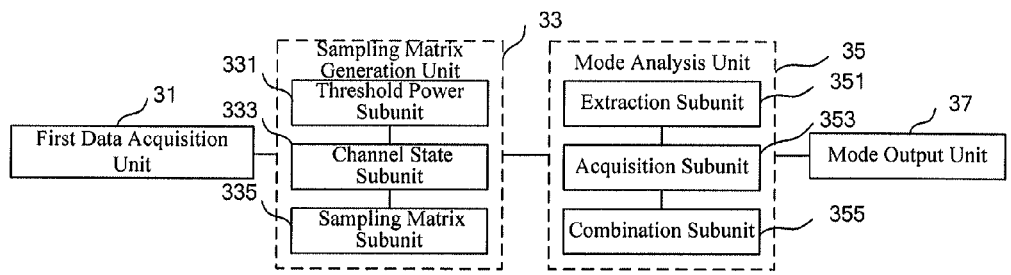
FIG. 11 is a structure diagram of a second example of an apparatus for spectrum resource occupancy mode extraction according to the present invention.

FIG. 11 is a structure diagram of a second example of an apparatus for spectrum resource occupancy mode extraction according to the present invention. As illustrated in FIG. 11, on the basis of the first example of the apparatus for spectrum resource occupancy mode extraction according to the present invention, the sampling matrix generation unit 33 may include a threshold power subunit 331, a channel state subunit 333 and a sampling matrix subunit 335. The threshold power subunit 331 is configured to obtain a minimum detected power of a selected channel of the service in a selected timeslot from the first sampling data, and set a threshold power of the selected channel according to the minimum detected power. The channel state subunit 333 is configured to determine that the channel state of the selected channel in the selected timeslot is busy when a maximum sampling power of the selected channel of the service in the selected timeslot is higher than the threshold power; otherwise determine that the channel state of the selected channel in the selected timeslot is idle. The sampling matrix subunit 335 is configured to integrate the channel state information of all channels of the same service in each timeslot into a 2D sampling matrix, wherein the element for the channel state information corresponding to the busy state is 1, and the element for the channel state information corresponding to the idle state is 0.

Further, the mode analysis unit 35 may include an extraction subunit 351, an acquisition subunit 353 and a combination subunit 355. The extraction subunit 351 is configured to extract from the sampling matrix, a first spectrum resource occupancy mode occurring in a frequency higher than a threshold. The acquisition subunit 353 is configured to obtain from the sampling matrix, a second spectrum resource occupancy mode occurring in a frequency higher than the threshold and associated with the first spectrum resource occupancy mode. The combination subunit 355 is configured to combine the first spectrum resource occupancy mode, the second spectrum resource occupancy mode and the correlation coefficient between the first and second spectrum resource occupancy modes into the spectrum resource occupancy mode combination in case the correlation coefficient is higher than a predetermined threshold.

Further, the apparatus for spectrum resource occupancy mode extraction may include a mode output unit 37 configured to output the spectrum resource occupancy mode combination.

Specifically, after the first data acquisition unit 31 acquires the first data of a selected segment of target spectrum in the wireless link, the sampling matrix generation unit 33 stores the acquired first sampling data. The threshold power subunit 331 of the sampling matrix generation unit 33 obtains a minimum detected power of a selected channel of the service in a selected timeslot from the first sampling data, and set a threshold power of the selected channel according to the minimum detected power. When a maximum sampling power of the selected channel of the service in the selected timeslot is higher than the threshold power, the channel state subunit 333 obtains that the channel state of the selected channel in the selected timeslot is busy; otherwise obtains that the channel state of the selected channel in the selected timeslot is idle. Next, the sampling matrix subunit 335 may integrate the channel state information of all channels of the same service in each timeslot into a 2D sampling matrix.

Next, the extraction subunit 351 of the mode analysis unit 35 extracts from the sampling matrix, the first spectrum resource occupancy mode occurring in a frequency higher than the threshold, the acquisition subunit 353 obtains from the sampling matrix, the second spectrum resource occupancy mode occurring in a frequency higher than the threshold and associated with the first spectrum resource occupancy mode, and in case the correlation coefficient between the first and second spectrum resource occupancy modes is higher than a predetermined threshold, the combination subunit 355 combines the first spectrum resource occupancy mode, the second spectrum resource occupancy mode and the correlation coefficient into the spectrum resource occupancy mode combination. And the mode output unit 37 outputs the spectrum resource occupancy mode combination.

In this embodiment, the first data acquisition unit acquires the first data of the target spectrum; the respective subunits of the sampling matrix generation unit extract channel state information of all channels of the same service in each timeslot, and generate a sampling matrix; the respective subunits of the mode analysis unit obtain the spectrum resource occupancy mode combination by analyzing the sampling matrix, so as to perform the spectrum prediction according to the correlativity between different channels of the same service, thereby increasing the spectrum access opportunity for the secondary user, reducing the miss ratio and omission ratio in the spectrum prediction process, and improving the accuracy of the spectrum prediction.

The apparatus for spectrum resource occupancy mode extraction according to the embodiment of the present invention may be implemented as circuits, integrated circuits, chips, etc. The various units according to the embodiment of the present invention may be integrated or separately arranged. The above units may be combined into one unit, or divided into a plurality of subunits.

Figure 12:
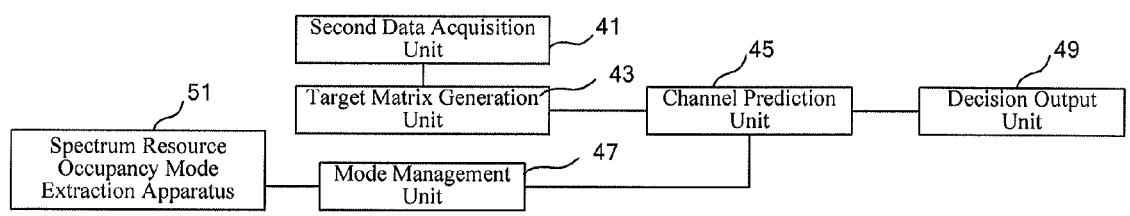
FIG. 12 is a structure diagram of an apparatus for spectrum resource prediction according to an embodiment of the present invention.

FIG. 12 is a structure diagram of an apparatus for spectrum resource prediction according to an embodiment of the present invention. As illustrated in FIG. 12, the apparatus for spectrum resource prediction includes a second data acquisition unit 41, a target matrix generation unit 43 and a channel prediction unit 45.

The second data acquisition unit 41 is configured to acquire second sampling data of a target spectrum, and the second sampling data includes service information, channel information and channel state information of the target spectrum in real time. The target matrix generation unit 43 is configured to extract from the second sampling data, channel state information of all channels of the same service in each timeslot, and generate a target matrix. The channel prediction unit 45 is configured to predict the channel state of the target spectrum in a future timeslot according to the second spectrum resource occupancy mode associated with the first spectrum resource occupancy mode when the target matrix has any data matching the first spectrum resource occupancy mode in the spectrum resource occupancy mode combination.

Further, the apparatus for spectrum resource prediction includes a mode management unit 47 configured to obtain the spectrum resource occupancy mode combination from an apparatus for spectrum resource occupancy mode extraction 51, and transmit the spectrum resource occupancy mode combination to the channel prediction unit 45.

Further, the apparatus for spectrum resource prediction may include a decision output unit 49 configured to output a predicted channel state of the target spectrum in the future timeslot.

Specifically, after the second data acquisition unit 41 acquires the second (sampling) data of the target spectrum, the target matrix generation unit 43 stores the acquired second sampling data of the target spectrum, extracts channel state information of all channels of the same service in each timeslot from the second sampling data, to generate a target matrix. The mode management unit 47 takes the result of the mode output unit of the apparatus for spectrum resource occupancy mode extraction 51 as an input, manages and stores the spectrum resource occupancy mode combination. And the output of the mode management unit 47 serves as the input to the channel prediction unit 45 for prediction. The spectrum resource occupancy mode combination includes a source mode field, a target mode field and a correlation coefficient field. When the target matrix has any data matching the first spectrum resource occupancy mode in the spectrum resource occupancy mode combination, the channel prediction unit 45 predicts the channel state of the target spectrum in a future timeslot such as the next timeslot according to the second spectrum resource occupancy mode associated with the first spectrum resource occupancy mode. Finally, the decision output unit 49 outputs a spectrum prediction result, i.e., a predicted channel state (idle or busy) of the target spectrum i n the future timeslot, wherein the prediction accuracy is corresponding correlation coefficient field in the mode management unit.

In this embodiment, the method for the spectrum resource prediction to perform the spectrum prediction may refer to relevant descriptions of the method for spectrum prediction according to the first and third embodiments of the present invention.

In this embodiment, after the second data acquisition unit acquires the second (sampling) data of the target spectrum, the target matrix generation unit extracts the channel state information of all channels of the same service in each timeslot from the second sampling data, and generates a target matrix. The channel prediction unit obtains a correlativity between different channels of the same service according to the spectrum resource occupancy mode combination extracted by the apparatus for spectrum resource occupancy mode extraction, and predicts the channel state of the target spectrum in a future timeslot, thereby increasing the spectrum access opportunity for the secondary user, reducing the miss ratio and omission ratio in the spectrum prediction process, and improving the accuracy of the spectrum prediction.

The apparatus for spectrum resource prediction according to the embodiment of the present invention may be implemented as circuits, integrated circuits, chips, etc. The various units according to the embodiment of the present invention may be integrated or separately arranged. The above units may be combined into one unit, or divided into a plurality of subunits.

Figure 13:
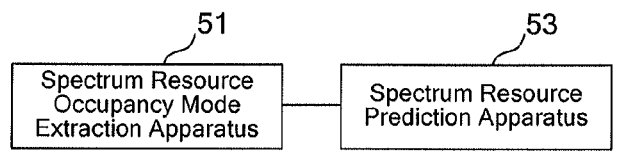
FIG. 13 is a structure diagram of a system for spectrum prediction according to an embodiment of the present invention.

FIG. 13 is a structure diagram of a spectrum prediction system according to an embodiment of the present invention. As illustrated in FIG. 13, the spectrum prediction system includes an apparatus for spectrum resource occupancy mode extraction 51 and an apparatus for spectrum resource prediction 53.

The apparatus for spectrum resource occupancy mode extraction 51 is configured to obtain first sampling data of a target spectrum which includes the existing service information, channel information and channel state information of the target spectrum, extract channel state information of all channels of the same service in each timeslot from the first sampling data to generate a sampling matrix, and extract a spectrum resource occupancy mode combination of the target spectrum from the sampling matrix. The apparatus for spectrum resource prediction 53 is configured to obtain second sampling data of the target spectrum, match the spectrum resource occupancy mode combination according to the second sampling data of the target spectrum, and predict the channel state of the target spectrum in a future timeslot according to the matching result.

Further, the apparatus for spectrum resource prediction is configured to acquire second data of the target spectrum to obtain the second sampling data including service information, channel information and channel state information of the target spectrum in real time, extract channel state information of all channels of the same service in each timeslot from the second sampling data to generate a target matrix, and predict the channel state of the target spectrum in a future timeslot according to the second spectrum resource occupancy mode associated with the first spectrum resource occupancy mode when the target matrix has any data matching the first spectrum resource occupancy mode in the spectrum resource occupancy mode combination.

Specifically, the apparatus for spectrum resource occupancy mode extraction 51 acquires the first data of the target spectrum to obtain the first sampling data, extracts the channel state information of all channels of the same service in each timeslot from the first sampling data to generate a sampling matrix, and extracts a spectrum resource occupancy mode combination of the target spectrum from the sampling matrix. Next, the apparatus for spectrum resource prediction 53 acquires the second data of the target spectrum to obtain the second sampling data, extracts the channel state information of all channels of the same service in each timeslot from the second sampling data to generate a sampling matrix, and predicts the channel state of the target spectrum in a future timeslot according to the second spectrum resource occupancy mode associated with the first spectrum resource occupancy mode when the target matrix has any data matching the first spectrum resource occupancy mode in the spectrum resource occupancy mode combination,. The detailed method may refer to relevant descriptions of the method for spectrum prediction according to the first to third embodiments of the present invention. In this embodiment, the apparatus for spectrum resource occupancy mode extraction 51 may adopt any one of the apparatuses for spectrum resource occupancy mode extraction according to the above embodiments, and the apparatus for spectrum resource prediction 53 may adopt any one of the apparatus for spectrum resource predictions according to the above embodiments.

In this embodiment, the spectrum prediction system may be a central spectrum controller in a CR network, and may be provided on a device like the base station.

In this embodiment, the apparatus for spectrum resource occupancy mode extraction can obtain the spectrum resource occupancy mode combination from the first data of the spectrum resource, and the apparatus for spectrum resource prediction matches the spectrum resource occupancy mode combination according to the second data of the target spectrum to predict the channel state of the target spectrum in a future timeslot, thereby increasing the spectrum access opportunity for the secondary user, reducing the miss ratio and omission ratio in the spectrum prediction process, and improving the accuracy of the spectrum prediction.

A person skilled in the art shall appreciate that all or a part of flows in the methods according to the above embodiments may be implemented by instructing relevant hardware through a program that may be stored in a computer readable storage medium, and when being executed, the program includes the flows of the method embodiments. The storage medium may be magnetic disk, optical disk, Read-Only Memory (ROM) or Random Access Memory (RAM), etc.

Finally to be noted, the above embodiments are just used to describe the technical solutions of the present invention rather than making a limitation thereto. Although the present invention is detailedly described with reference to the above embodiments, a person skilled in the art shall appreciate that the technical solutions recorded in the above embodiments still can be changed, or some technical features thereof can be equivalently replaced, without making the essences of corresponding technical solutions deviated from the spirit and range of the technical solutions of respective embodiments of the present invention.

What is claimed is:

1. A method for spectrum prediction, comprising:
   obtaining first sampling data of a target spectrum, wherein the first sampling data comprises existing service information, channel information and channel state information of the target spectrum;
   extracting channel state information of all channels of a same service in each timeslot from the first sampling data, and generating a sampling matrix;
   extracting a spectrum resource occupancy mode combination of the target spectrum from the sampling matrix; and
   obtaining a second sampling data of the target spectrum, matching the spectrum resource occupancy mode combination according to the second sampling data of the target spectrum, and predicting the channel state of the target spectrum in a future timeslot according to the matching result.

2. The method according to claim 1, wherein obtaining the first sampling data of the target spectrum comprises:
   acquiring first data of the target spectrum to obtain the first sampling data, wherein the first data comprises historic data.

3. The method according to claim 1, wherein extracting the channel state information of all channels of a same service in each timeslot from the first sampling data, and generating the sampling matrix comprises:
   obtaining a minimum detected power of a selected channel of the service in a selected timeslot from the first sampling data, and setting a threshold power of the selected channel according to the minimum detected power;
   when a maximum sampling power of the selected channel of the service in the selected timeslot is higher than the threshold power, the channel state of the selected channel in the selected timeslot is busy; otherwise the channel state of the selected channel in the selected timeslot is idle; and
   integrating the channel state information of all channels of the same service in each timeslot into the sampling matrix.

4. The method according to claim 1, wherein extracting the spectrum resource occupancy mode combination of the target spectrum from the sampling matrix comprises:
   extracting from the sampling matrix, a first spectrum resource occupancy mode occurring in a frequency higher than a threshold;
   obtaining from the sampling matrix, a second spectrum resource occupancy mode occurring in a frequency higher than the threshold and associated with the first spectrum resource occupancy mode; and
   when a correlation coefficient between the first and second spectrum resource occupancy modes is higher than a predetermined threshold, combining the first spectrum resource occupancy mode, the second spectrum resource occupancy mode and the correlation coefficient into the spectrum resource occupancy mode combination.

5. The method according to claim 4, wherein,
   the association between the first and second spectrum resource occupancy modes is a relation between a source mode and a target mode;
   when the first spectrum resource occupancy mode is comprised in the second spectrum resource occupancy mode, the first spectrum resource occupancy mode is the source mode, and the second spectrum resource occupancy mode is the target mode; or
   when the second spectrum resource occupancy mode occurs at an interval of a certain number of timeslots after the first spectrum resource occupancy mode occurs, the first spectrum resource occupancy mode is the source mode, and the second spectrum resource occupancy mode is the target mode.

6. The method according to claim 1, wherein obtaining the second sampling data of the target spectrum, matching the spectrum resource occupancy mode combination according to the second sampling data of the target spectrum, and predicting the channel state of the target spectrum in the future timeslot according to the matching result comprises:
   acquiring second data of the target spectrum to obtain the second sampling data, wherein the second sampling data comprises service information, channel information and channel state information of the target spectrum in real time;
   extracting from the second sampling data, the channel state information of all channels of the same service in each timeslot, and generating a target matrix; and
   when the target matrix has any data matching a first spectrum resource occupancy mode in the spectrum resource occupancy mode combination, predicting the channel state of the target spectrum in the future timeslot according to a second spectrum resource occupancy mode associated with the first spectrum resource occupancy mode.

7. The method according to claim 1, further comprising:
   when the state of a channel of the target spectrum in a future timeslot is idle, selecting the channel for an access in the future timeslot.

8. An apparatus for spectrum resource occupancy mode extraction, comprising:
   a first data acquisition unit, configured to obtain first sampling data of a target spectrum, wherein the first sampling data comprises existing service information, channel information and channel state information of the target spectrum;
   a sampling matrix generation unit, configured to extract the channel state information of all channels of a same service in each timeslot from the first sampling data, and generate a sampling matrix; and
   a mode analysis unit, configured to analyze the sampling matrix, and extract a spectrum resource occupancy mode combination of the target spectrum from the sampling matrix.

9. The apparatus according to claim 8, wherein the sampling matrix generation unit comprises:
   a threshold power subunit, configured to obtain a minimum detected power of a selected channel of the service in a selected timeslot from the first sampling data, and set a threshold power of the selected channel according to the minimum detected power;
   a channel state subunit, configured to obtain that the channel state of the selected channel in the selected timeslot is busy when a maximum sampling power of the selected channel of the service in the selected timeslot is higher than the threshold power; otherwise obtain that the channel state of the selected channel in the selected timeslot is idle; and a sampling matrix subunit, configured to integrate the channel state information of all channels of the same service in each timeslot into the sampling matrix.

10. The apparatus according to claim 8, wherein the mode analysis unit comprises:
   an extraction subunit, configured to extract from the sampling matrix, a first spectrum resource occupancy mode occurring in a frequency higher than a threshold;
   an acquisition subunit, configured to obtain from the sampling matrix, a second spectrum resource occupancy mode occurring in a frequency higher than the threshold and associated with the first spectrum resource occupancy mode; and
   a combination subunit, configured to, combine the first spectrum resource occupancy mode, the second spectrum resource occupancy mode and a correlation coefficient between the first and second spectrum resource occupancy modes into the spectrum resource occupancy mode combination, when the correlation coefficient is higher than a predetermined threshold.

11. An apparatus for spectrum resource prediction, comprising:
   a second data acquisition unit, configured to obtain the second sampling data of a target spectrum, wherein the second sampling data comprises service information, channel information and channel state information of the target spectrum in real time;
   a target matrix generation unit, configured to extract from the second sampling data, the channel state information of all channels of a same service in each timeslot, and generate a target matrix; and
   a channel prediction unit, configured to, when the target matrix has any data matching a first spectrum resource occupancy mode in a spectrum resource occupancy mode combination, predict the channel state of the target spectrum in a future timeslot according to a second spectrum resource occupancy mode associated with the first spectrum resource occupancy mode.

12. The apparatus according to claim 11, further comprises:
   a mode management unit, configured to obtain the spectrum resource occupancy mode combination from an apparatus for spectrum resource occupancy mode extraction and transmit the spectrum resource occupancy mode combination to the channel prediction unit.

13. A system for spectrum prediction, comprising:
   an apparatus for spectrum resource occupancy mode extraction, configured to obtain the first sampling data of a target spectrum, wherein the first sampling data comprises the existing service information, channel information and channel state information of the target spectrum; extract the channel state information of all channels of a same service in each timeslot from the first sampling data and generate a sampling matrix; and extract a spectrum resource occupancy mode combination of the target spectrum from the sampling matrix; and
   an apparatus for spectrum resource prediction, configured to obtain the second sampling data of the target spectrum, match the spectrum resource occupancy mode combination according to the second sampling data of the target spectrum, and predict the channel state of the target spectrum in a future timeslot according to the matching result.

\* \* \* \* \*